United States Patent
Yamauchi et al.

(10) Patent No.: US 9,462,213 B2
(45) Date of Patent: Oct. 4, 2016

(54) VIDEO DISPLAY DEVICE

(71) Applicant: PANASONIC CORPORATION, Osaka (JP)

(72) Inventors: Kenji Yamauchi, Mie (JP); Satoshi Koura, Mie (JP); Yachiyo Shimokawatoko, Mie (JP); Masatoshi Okuyama, Mie (JP); Masahiro Yukawa, Kyoto (JP); Taketo Kawauchi, Osaka (JP); Ken Miura, Osaka (JP); Satoshi Takayama, Mie (JP); Shoji Nakajima, Mie (JP); Hideaki Inoue, Mie (JP); Mitsukazu Kuze, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 423 days.

(21) Appl. No.: 13/740,797

(22) Filed: Jan. 14, 2013

(65) Prior Publication Data

US 2013/0128130 A1 May 23, 2013

Related U.S. Application Data

(63) Continuation of application No. PCT/JP2012/003083, filed on May 11, 2012.

(30) Foreign Application Priority Data

May 11, 2011 (JP) .................................. 2011-105968
Dec. 27, 2011 (JP) .................................. 2011-285020

(51) Int. Cl.
*H04N 5/64* (2006.01)
*H04R 1/34* (2006.01)
(Continued)

(52) U.S. Cl.
CPC .............. *H04N 5/642* (2013.01); *H04R 1/347* (2013.01); *H04R 5/02* (2013.01); *H04R 1/025* (2013.01);
(Continued)

(58) Field of Classification Search
CPC ........ H04N 5/64; H04N 5/645; H04N 5/655; H04N 5/642; G06F 1/1601; H04R 1/025; H04R 1/026; H04R 1/347; H04R 1/403; H04R 2201/403; H04R 2499/15; H04R 5/02; H04R 7/04
USPC .......................................................... 348/836
See application file for complete search history.

(56) References Cited

U.S. PATENT DOCUMENTS 5,759,044 A * 6/1998 Redmond .................. 434/307 R
5,943,430 A * 8/1999 Saitoh .................... H04N 5/642
181/155

(Continued)

FOREIGN PATENT DOCUMENTS

JP 08-223678 A 8/1996
JP 08-251686 A 9/1996
(Continued)

OTHER PUBLICATIONS

International Search Report issued in International Patent Application No. PCT/JP2012/003083 mailed Jul. 10, 2012.

*Primary Examiner* — Shan Elahi
(74) *Attorney, Agent, or Firm* — McDermott Will & Emery LLP

(57) ABSTRACT

A video display device includes a video display panel that displays video, a case that encloses an outer periphery of the video display panel, an audio device that is arranged in proximity to the outer periphery of the video display panel, the audio device being configured to linearly arrange a plurality of speakers, and a sound emitting hole that corresponds to an opening of the audio device, the sound emitting hole being provided to the case and emitting sound generated by the audio device.

11 Claims, 9 Drawing Sheets

(51) Int. Cl.
*H04R 5/02* (2006.01)
*H04R 1/40* (2006.01)
*H04R 7/04* (2006.01)
*H04R 1/02* (2006.01)

(52) U.S. Cl.
CPC .............. *H04R 1/026* (2013.01); *H04R 1/403* (2013.01); *H04R 7/04* (2013.01); *H04R 2201/403* (2013.01); *H04R 2499/15* (2013.01)

(56) References Cited

U.S. PATENT DOCUMENTS

| | | | |
|---|---|---|---|
| 7,684,175 B2* | 3/2010 | Takao | 361/679.01 |
| 8,180,074 B2* | 5/2012 | Ko et al. | 381/152 |
| 8,422,720 B2* | 4/2013 | Johannesen | 381/386 |
| 8,750,553 B2* | 6/2014 | Park et al. | 381/387 |
| 8,953,825 B2* | 2/2015 | Lim | H04R 3/04 381/306 |
| 8,988,867 B2* | 3/2015 | Kuroda | 361/679.21 |
| 9,071,215 B2* | 6/2015 | Sato | |
| 2001/0043714 A1* | 11/2001 | Asada | H04R 5/02 381/399 |
| 2005/0129261 A1 | 6/2005 | Ito et al. | |
| 2005/0147273 A1* | 7/2005 | Azima | B42D 15/022 381/431 |
| 2005/0174498 A1* | 8/2005 | Wu | B60R 11/0235 348/837 |
| 2005/0261815 A1* | 11/2005 | Cowelchuk et al. | 701/36 |
| 2006/0008103 A1* | 1/2006 | Takahashi et al. | 381/333 |
| 2006/0034479 A1 | 2/2006 | Oshika et al. | |
| 2007/0071259 A1 | 3/2007 | Tojo | |
| 2007/0165895 A1* | 7/2007 | Matsumura | H04R 1/2803 381/351 |
| 2007/0183619 A1* | 8/2007 | Kuribayashi | H04R 7/14 381/396 |
| 2007/0195982 A1* | 8/2007 | Saiki | H04R 1/2803 381/345 |
| 2008/0085019 A1* | 4/2008 | Wagenaars et al. | 381/152 |
| 2008/0159570 A1* | 7/2008 | Hung | H04N 5/642 381/160 |
| 2008/0159582 A1* | 7/2008 | Kawasaki-Hedges | H04R 5/02 381/388 |
| 2008/0170737 A1* | 7/2008 | Saiki | H04R 1/2803 381/346 |
| 2008/0172859 A1* | 7/2008 | Hutt | B60R 11/0223 29/594 |
| 2008/0212808 A1* | 9/2008 | Omoda | H04R 7/14 381/191 |
| 2008/0260178 A1* | 10/2008 | Tanaka | 381/92 |
| 2008/0278622 A1* | 11/2008 | Singh et al. | 348/441 |
| 2009/0009944 A1* | 1/2009 | Yukawa et al. | 361/681 |
| 2009/0034759 A1* | 2/2009 | Ko et al. | 381/152 |
| 2009/0168321 A1* | 7/2009 | Kataoka et al. | 361/679.22 |
| 2009/0190790 A1* | 7/2009 | Yamagami | 381/394 |
| 2010/0158282 A1 | 6/2010 | Fujise et al. | |
| 2011/0019844 A1* | 1/2011 | Chang | 381/160 |
| 2011/0019853 A1* | 1/2011 | Chang | 381/338 |
| 2011/0211121 A1* | 9/2011 | Lim | H04R 3/04 348/578 |
| 2011/0248935 A1* | 10/2011 | Mellow et al. | 345/173 |
| 2011/0292315 A1* | 12/2011 | Bae | G02B 6/0088 349/58 |
| 2011/0316990 A1* | 12/2011 | Saito | H04N 13/0044 348/51 |
| 2012/0052606 A1* | 3/2012 | Yamazaki | H01L 27/1225 438/23 |
| 2012/0057736 A1* | 3/2012 | Shiozawa et al. | 381/353 |
| 2012/0092448 A1* | 4/2012 | Tokunaga | G06T 7/0022 348/42 |
| 2012/0250930 A1* | 10/2012 | Kajihara | H04R 7/12 381/412 |
| 2012/0314024 A1* | 12/2012 | Tsang | G09G 3/003 348/43 |
| 2013/0128130 A1* | 5/2013 | Yamauchi | H04N 5/642 348/836 |

FOREIGN PATENT DOCUMENTS

| | | |
|---|---|---|
| JP | 2005-079809 A | 3/2005 |
| JP | 2005-117201 A | 4/2005 |
| JP | 2008-153716 A | 7/2008 |
| JP | 2009-189050 A | 8/2009 |
| WO | WO-2008/142867 A1 | 11/2008 |

* cited by examiner

VIDEO DISPLAY DEVICE

This application is a continuation in part application of Patent Cooperation Treaty Patent Application No. PCT/JP2012/003083 (filed on May 11, 2012), which claims priority from Japanese patent application JP 2011-105968 (filed on May 11, 2011) and JP 2011-285020 (filed on Dec. 27, 2011). All of which are incorporated by reference herein in their entirely.

TECHNICAL FIELD

The present invention relates to a video display device provided with a display and an audio device, which is used in television receivers, game equipment, personal computers, information communications equipment, digital signages, and the like.

BACKGROUND ART

In recent years, in the video industry, in video display devices of television receivers (hereinafter referred to as "television" in short) represented by plasma televisions or liquid crystal televisions, there is an increasing demand for reduction in thickness and space savings.

In past days when the television using a cathode-ray tube having a large lateral dimension was the mainstream, even when the cathode-ray tube is disposed on a front surface of the television, an audio device having a large volume can be mounted by utilizing the large lateral dimension of a back portion of the cathode-ray tube that becomes narrower toward a back surface. Accordingly, as long as the audio device has a slim or narrow front surface, having a large lateral dimension was not a problem in mounting the audio device to the television.

However, for the plasma television and the liquid crystal television, not only a display module itself is thin, but also there is no need to provide an extra space in its back surface. Moreover, it has been demanded to improve commodity value of the plasma television and the liquid crystal television by (i) ensuring the displaying area of a plasma panel and a liquid crystal panel as large as possible to increase visibility of the video display device such as television, and (ii) reducing the area or the volume of other parts as much as possible to achieve a so-called slim border realizing reduction in dimensions and thickness and space savings. Accordingly, in mounting the audio device, it is very difficult to utilize the volume in the lateral direction as in the CRT televisions. Thus, under the present circumstances, reduction in dimensions and thickness is demanded also in the audio devices mounted in these video display devices.

The conventional video display device, which is an example of the conventional electronic equipment, and the audio device mounted in the video display device will be described below with reference to the drawings.

FIG. 10 is a perspective view showing appearance of such video display device. FIG. 11 is a longitudinal sectional view of the audio device used in a conventional video display device. As shown in FIG. 10, a conventional audio device in the video display device such as a plasma television and a liquid crystal television, is arranged such that the speaker system 37 is arranged horizontally and that the front side of the speaker system 37 is oriented toward the lower side surface of the plasma panel or the liquid crystal panel. In such display device, a horizontally-long cone-type slim speaker for normal televisions having a small width is widely used in speaker system 37 so as to conform the shape of the horizontally-long audio device.

As shown in FIG. 11, speaker system 37 of the conventional audio device includes enclosure 34 and cone-shaped slim speaker 35. Enclosure 34 is configured by front panel 31, back panel 32, and side panels. Cone-shaped slim speaker 35 is attached to the inner side of front panel 31 of enclosure 34, a speaker cord is connected to a terminal provided in slim speaker 35, and the speaker cord is routed by aerial wiring.

Speaker system 37 is horizontally formed such that dimensions of video equipment such as the plasma television and the liquid crystal television can be reduced even when its surface is oriented to front direction at the lower side surface of the plasma panel or the liquid crystal panel. For this reason, horizontal cone-shaped slim speaker 35 for normal television is used according to horizontally long shape of speaker system 37.

Cone-shaped slim speaker 35 is configured by magnetized magnet 41, internal magnet-type magnetic circuit 44, a horizontally-long slim frame 46, cone-shaped slim diaphragm 47, voice coil 48, damper 49, and dust cap 50.

Internal magnet-type magnetic circuit 44 is configured by sandwiching magnet 41 between upper plate 42 and yoke 43. Internal magnet-type magnetic circuit 44 is coupled to a lower part of horizontally-long slim frame 46, and cone-shaped slim diaphragm 47 is bonded to the periphery of slim frame 46. Voice coil 48 for driving slim diaphragm 47 is coupled to cone-shaped slim diaphragm 47, centrally held by damper 49, and coupled so as to be fitted into magnetic gap 45 of magnetic circuit 44, thereby bonding dust cap 50 to the front surface of cone-shaped slim diaphragm 47 (refer to, for example, PTLs 1, 2, 3, and 4).

The conventional video display device has achieved reduction in dimensions and thickness and space savings, which are demanded in the market, to some extent. However, when further reduction in dimensions and thickness and space savings are requested to improve the commodity value, the conventional video display device has reached its limits since it uses the speaker for the television of normal size.

That is, for the cone-shaped slim speaker for the television of normal size, it is possible to design the vertical dimension and the horizontal dimension of the speaker small. However, since the slim speaker is cone-shaped, it requires a certain degree of lateral dimension. Thus, in consideration of dimensions of the enclosure of the speaker, the speaker becomes larger than the dimension of the video display panel in the lateral direction.

Therefore, it is difficult to achieve reduction in dimensions and thickness and space savings of the video display device.

PATENT LITERATURES

PTL 1: Unexamined Japanese Patent Publication No. 2008-153716
PTL 2: Unexamined Japanese Patent Publication No. H08-223678
PTL 3: Unexamined Japanese Patent Publication No. H08-251686
PTL 4 Unexamined Japanese Patent Publication No. 2005-79809

SUMMARY OF THE INVENTION

A video display device of the present invention includes a video display panel that displays video, a case that encloses an outer periphery of the video display panel, and an audio device that is arranged in the case and emits sound. The audio device is arranged along the video display panel in the vertical direction or in the horizontal direction of the outer periphery of the video display panel, and is configured so that at least two or more compact speakers are linearly arranged. A sound emitting hole corresponding to an opening of the audio device is provided to the case which encloses the outer periphery of the video display panel. Sound generated by the audio device is emitted from the sound emitting hole to the outside through the opening.

DETAILED DESCRIPTION

First Exemplary Embodiment

A first exemplary embodiment as an exemplary embodiment of the present invention will be described with reference to the drawings. Examples of a flat panel video display device include a plasma television and a liquid crystal television. In a video display device in this exemplary embodiment, an audio device is provided at a lower side of a video display panel.

Herein, the audio device is provided along the lower side of the video display panel in the longitudinal direction, and a plurality of compact speakers are arranged. In following description, eight compact speakers are arranged, wherein the compact speakers of the present invention are referred to as compact speakers, microspeakers, or merely, speakers. In this exemplary embodiment, an amplitude direction (hereinafter referred to as "diaphragm amplitude direction") in which a diaphragm of each compact speaker oscillates is set to be substantially parallel to or orthogonal to a video display surface of the video display panel. In following description, the diaphragm amplitude direction of each compact speaker is substantially parallel to the video display surface of the video display panel. By using these compact speakers, bezel of the video display device is further realized.

Figure 1:
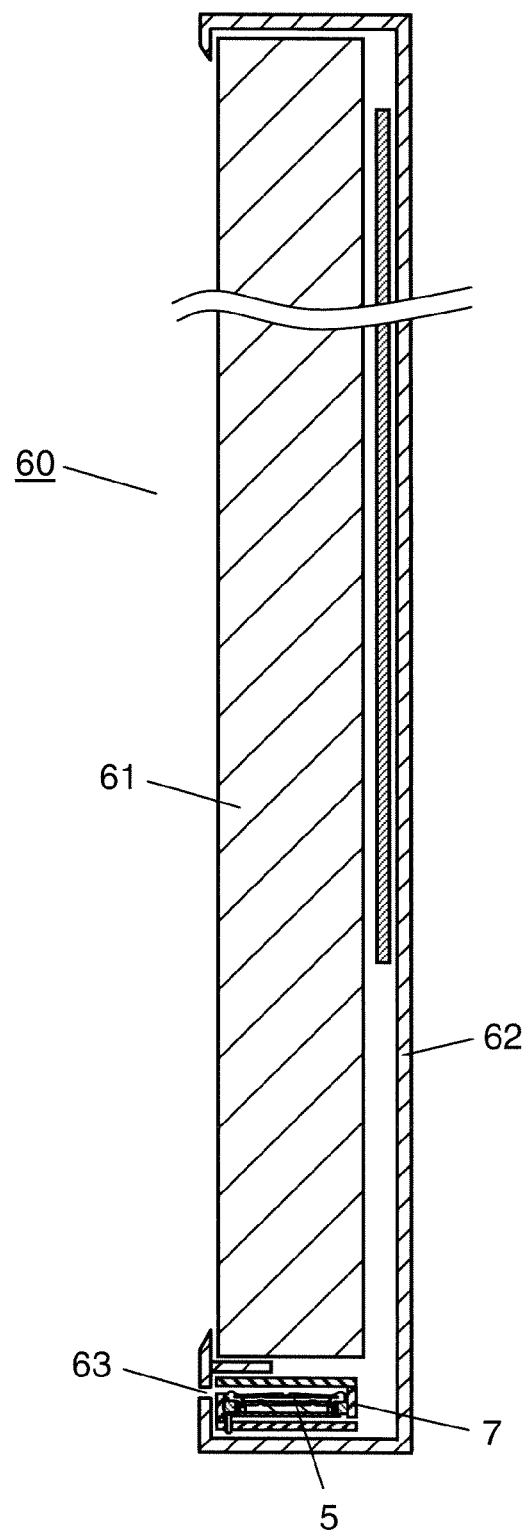
FIG. 1 is a sectional view of a video display device according to a first exemplary embodiment of the present invention.
Figure 2:
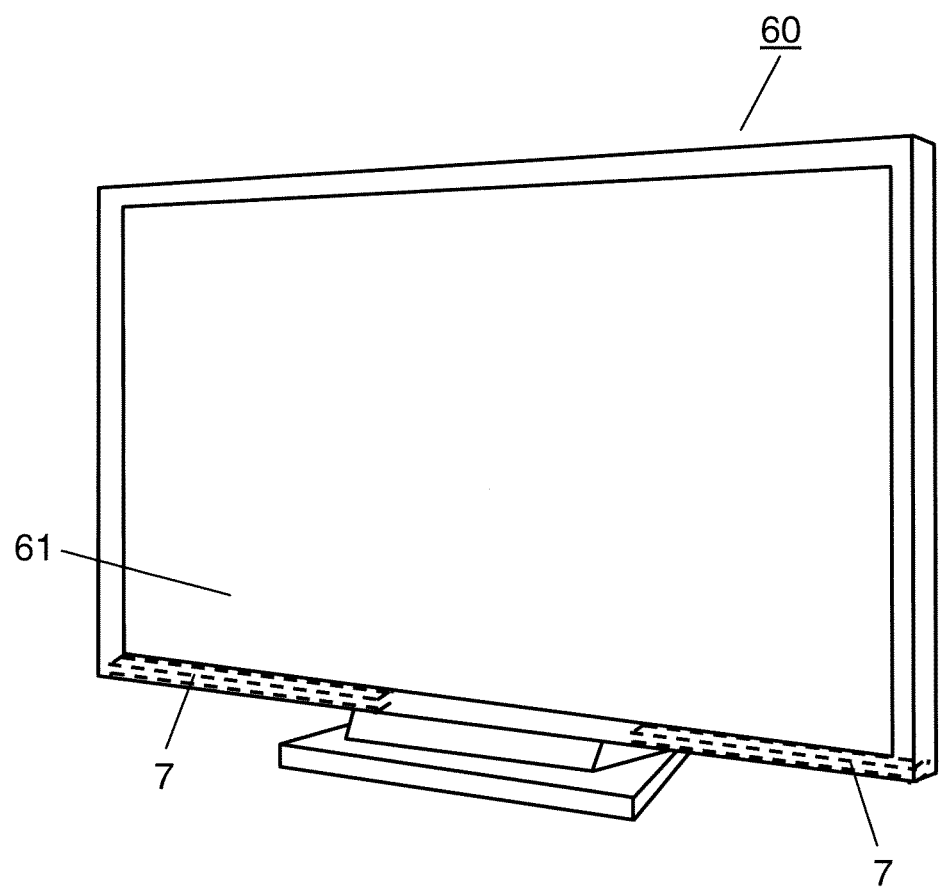
FIG. 2 is a perspective view of the video display device according to the first exemplary embodiment of the present invention.
Figure 3:
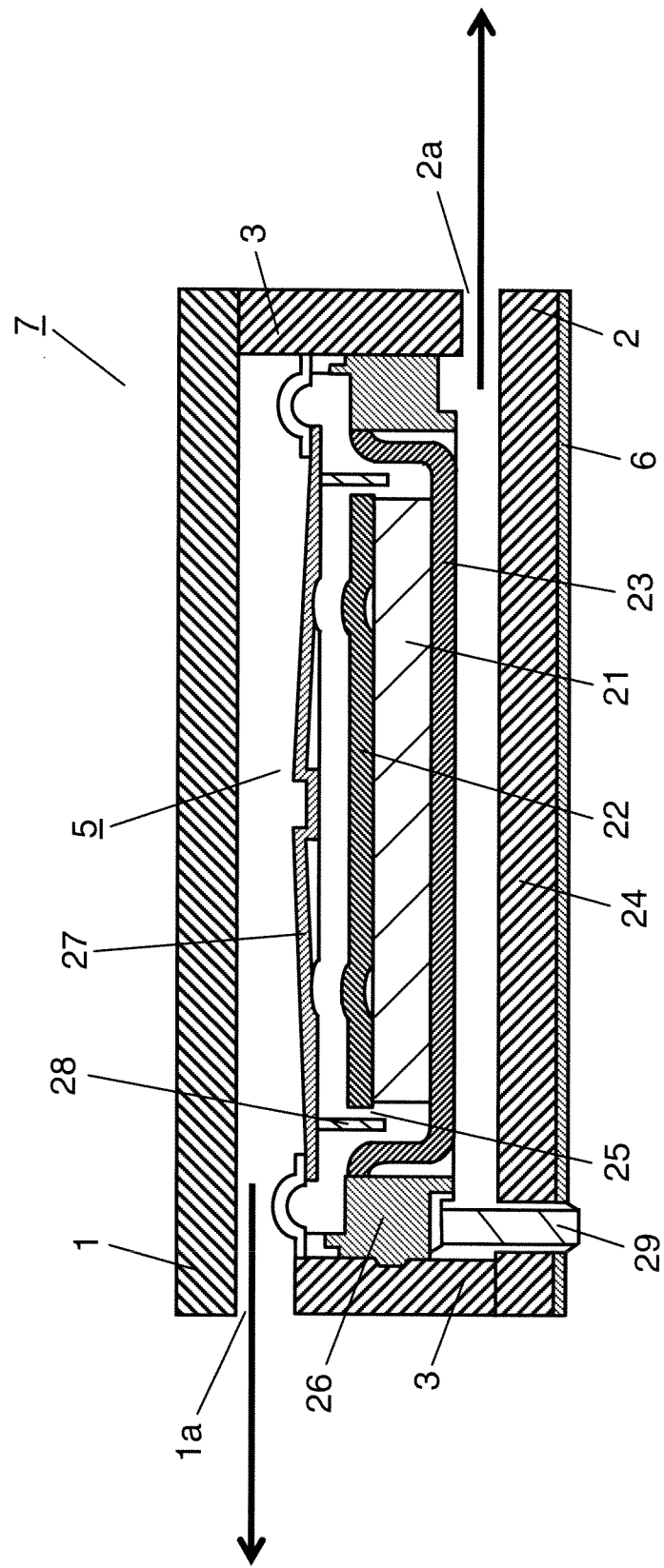
FIG. 3 is a transverse sectional view of an audio device according to the first exemplary embodiment of the present invention.
Figure 4:
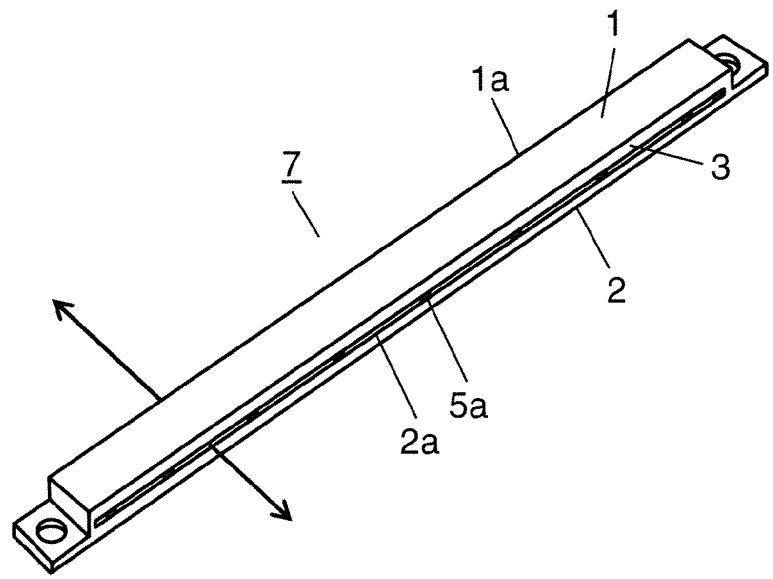
FIG. 4 is a perspective view of the audio device according to the first exemplary embodiment of the present invention.
Figure 5:
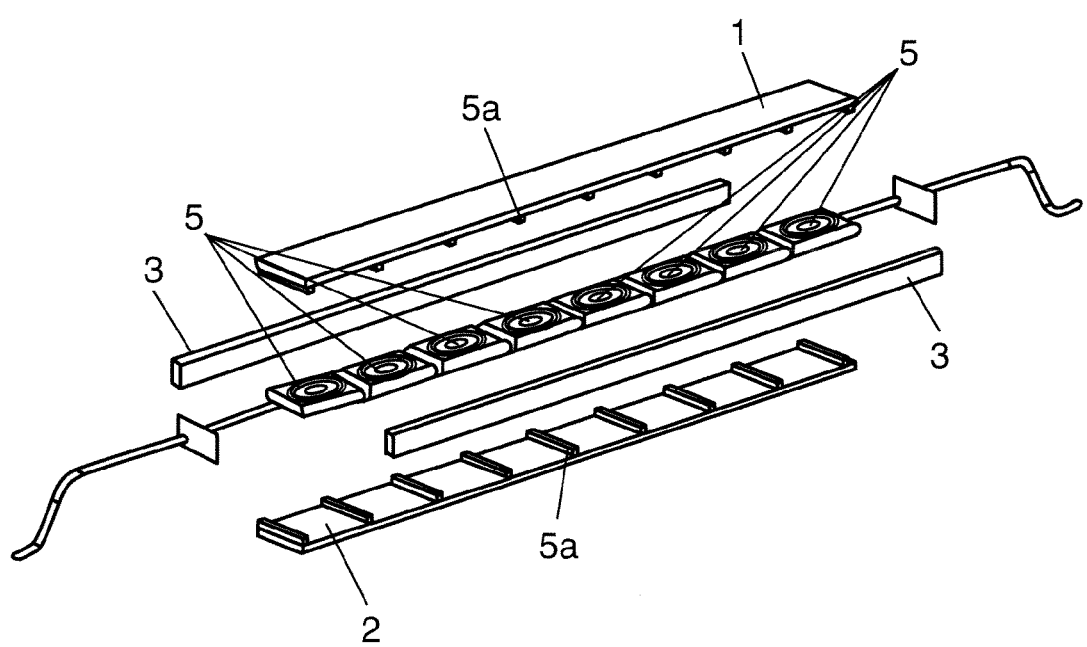
FIG. 5 is an exploded perspective view of the audio device according to the first exemplary embodiment of the present invention.

FIG. 1 is a sectional view of video display device 60 according to the first exemplary embodiment of the present invention. FIG. 2 is a perspective view of video display device 60 according to the first exemplary embodiment of the present invention. FIG. 3 is a transverse sectional view of audio device 7 in the first exemplary embodiment of the present invention. FIG. 4 is a perspective view of audio device 7 according to the first exemplary embodiment of the present invention. FIG. 5 is an exploded perspective view of audio device 7 according to the first exemplary embodiment of the present invention.

As shown in FIG. 1 to FIG. 5, video display device 60 according to the first exemplary embodiment of the present invention is configured by video display panel 61, case 62, and audio device 7.

As shown in FIG. 1, video display panel 61 is arranged at the center of video display device 60 and displays video. Video display panel 61 has a flat plate shape and is, for example, a plasma display panel or a liquid crystal panel. Case 62 includes a front cabinet (frame) which is a frame-like member that surrounds the outer periphery of video display panel 61, and a back cabinet that covers a back surface of video display panel 61. The front cabinet can accommodate audio device 7 that emits sound. Audio device 7 is configured by linearly arranging a plurality of compact speakers 5 along video display panel 61. Audio device 7 is arranged below the outer periphery of video display panel 61. In the audio device 7, for example, eight compact speakers 5 are accommodated. Specific configuration of audio device 7 will be described later in detail with reference to FIG. 3, FIG. 4 and FIG. 5.

Sound emitting hole 63 is provided on a front surface side of the frame. The frame is provided with an accommodating portion that accommodates audio device 7, and audio device 7 is fixed to the frame by inserting audio device 7 from below the frame. Sound emitting hole 63 is provided so as to correspond to an opening of audio device 7 thus fixed. That is, as shown in FIG. 2, audio device 7 is provided on the front surface side of video display panel 61 and on the outer side of the outer periphery of video display panel 61. With this configuration, sound generated by compact speakers 5 of audio device 7 is emitted to the outside of video display device 60 through slit-like opening 1a of audio device 7 and slit-like sound emitting hole 63 of video display device 60. In this exemplary embodiment, the sound emitting hole 63 of video display device 60 is a formed by a single rectangular hole. Instead, it may be formed by a single elliptical hole. Or, it may be formed by a plurality of rectangular, circular, or elliptical holes which are linearly arranged.

By providing sound emitting hole 63 at the lower side of video display panel 61, the audio device 7 can be arranged at a position close to the viewer's ears, and furthermore, excellent sound quality and stereo reproduction can be achieved by providing a pair of sound emitting holes 63 of video display device 60 on each of right and left sides.

A dimension of audio device 7 in the lateral direction is set to be smaller than that of video display panel 61. Thus, a gap can be formed between audio device 7 and a back surface of case 62. Accordingly, since a fixing member that fixes audio device 7 to case 62 can be arranged in this gap, the thickness of video display device 60 can be reduced. However, the dimension of audio device 7 in the lateral direction may be the same as that of video display panel 61.

In this exemplary embodiment, the amplitude direction of diaphragm 27 of each compact speaker 5 is substantially parallel to the video display surface of video display panel 61. That is, each compact speaker 5 is arranged such that a front surface of diaphragm 27 (upper side of the diaphragm in FIG. 1) faces a lower end surface of the video display panel, and compact speakers 5 emit sound, which is emitted mainly toward the front surface of diaphragm 27, from sound emitting hole 63 to the outside of video display device 60.

Here, on the back surface side of diaphragm 27, sound having a phase opposite to sound emitted toward the front surface occurs, however, the sound emitted toward the back surface of diaphragm 27 is emitted inside of case 62, and is prevented from leaking outside of video display device 60 as much as possible. With this configuration, the sound having the opposite phase component occurred on the back surface side of diaphragm 27 can be suppressed from diffracting to the front surface side. Thus, mixture of the sound emitted toward the front surface of diaphragm 27 and the sound having the opposite phase component emitted toward the back surface of diaphragm 27 can be suppressed. Therefore, negative effects such as decrease in the sound pressure level can be prevented, thereby reproducing sound having excellent characteristics and quality.

With the above-mentioned configuration, since sound can be emitted from sound emitting hole 63 of video display device 60, a narrow bezel of video display device 60 can be achieved. Furthermore, since video display device 60 having excellent sound quality can be obtained, reduction in dimensions, reduction in thickness, and space savings is realized while maintaining the high quality-performance of the video display device 60.

As shown in FIG. 1 and FIG. 2, compact speakers 5 in this exemplary embodiment are arranged such that the front surfaces of diaphragms 27 are oriented to video display panel 61. Thus, sound emitting hole 63 of audio device 7 can be easily disposed close to video display panel 61. Thereby, mixture of video and audio is improved and can provide realistic video and audio.

Each compact speaker 5 may be arranged such that the back surface of diaphragm 27 is oriented to video display panel 61. In this case, sound emitting hole 63 of audio device 7 is arranged in the front surface of diaphragm 27 of each compact speaker 5 too. Accordingly, sound emitting hole 63 of audio device 7 is located away from video display panel 61. Thus, the mounting direction of compact speakers 5 can be appropriately changed, and can improve the degree of freedom in overall design of video display device 60.

Next, configurations of audio device 7 and compact speakers 5 in FIG. 3 will be described.

Magnetic circuit 24 of each compact speaker 5 in this exemplary embodiment is internal magnet-type, and magnetized magnet 21 is sandwiched between upper plate 22 and yoke 23. Frame 26 has a horizontally-long slim shape and is coupled to magnetic circuit 24. Diaphragm 27 is also slim shaped and is bonded to the edge of frame 26. Voice coil 28 is coupled to diaphragm 27, drives diaphragm 27, and is coupled to magnetic gap 25 of magnetic circuit 24 so as to be fitted therein.

In audio device 7, front panel 1 of audio device 7 is provided on the front surface side of diaphragm 27 of each compact speaker 5, and back panel 2 of audio device 7 is provided on the opposite side, wherein back panel 2 is provided with wiring means 6. Further, side panels 3 are provided on the side surfaces of compact speaker 5 so as to surround compact speaker 5 to constitute audio device 7. Opening 1*a* is provided in audio device 7. Opening 1*a* is formed to emit sound generated by diaphragm 27, and in this exemplary embodiment, slit-like opening 1*a* is formed on the front surface side of diaphragm 27. That is, opening 1*a* of audio device 7 is formed in a surface substantially parallel to the video display surface of video display panel 61. Slit-like opening 2*a* is provided in the back surface side of diaphragm 27. In this exemplary embodiment, both of slit-like opening 1*a* and slit-like opening 2*a* are provided in side panel 3.

Terminal 29 is a terminal that supplies a signal to compact speakers 5, and is coupled to voice coil 28. Terminal 29 is inserted into a hole provided in back panel 2, and is coupled to wiring means 6, so that a sound signal outputted from an amplifier (not shown) provided in video display device 60 is supplied to compact speakers 5 via wiring means 6.

In this exemplary embodiment, wiring means 6 is formed of a printed board, and eight compact speakers 5 are attached to wiring means 6. Terminal 29 is electrically connected to wiring means 6 by use of coupling means such as soldering. Soldering connection between terminal 29 and wiring means 6 can be performed by one operation, for example, reflow soldering. For this reason, even when a number of compact speakers such as eight compact speakers are used, manufacturing efficiency can be improved. The external shape of compact speakers 5 only needs to be rectangle, track-like, or ellipse. Furthermore, the speakers are linearly arranged in the longitudinal direction of the speakers. Thereby, even when a number of compact speakers 5 are linearly arranged, audio device 7 can be shaped such that the narrow bezel of video display device 60 is achieved.

With the above-mentioned configuration, compact speaker 5 can be made much smaller in the vertical dimension, the horizontal dimension, and an overall height compared to the conventional cone-shaped slim speaker utilized in the television of normal size. Furthermore, since flat diaphragm 27 is used and no damper is used, especially, the overall height of speaker 5 can be reduced, thereby reducing the overall height of audio device 7.

In such audio device 7 having reduced overall height, the amplitude direction of diaphragms 27 is made parallel to the video display surface of the video display panel. This greatly contributes to the bezel narrowing of the video display device and to achieve reduction in dimensions and thickness and space savings of the video display device. Further, by using flat diaphragms 27, when compared to the case where the cone-shaped diaphragms are used, irregularity hardly occurs in the shape of slit-like opening 1*a* provided between diaphragms 27 and front panel 1 of audio device 7. Accordingly, it is possible to reduce negative effects such as a front chamber effect and a diffraction effect which are the factors that deteriorate frequency characteristics and sound quality of audio device 7.

In the above description, the amplitude direction of diaphragm 27 of each compact speaker 5 in audio device 7 is made parallel to the video display surface of video display panel 61, however, the present invention is not limited thereto, the amplitude direction of diaphragm 27 of compact speaker 5 may be orthogonal to the video display surface of video display panel 61. In this case, the bezel narrowing effect to video display device 60 is slightly decreased. However, since sound generated from diaphragm 27 of each compact speaker 5 is directly emitted to the outside without passing through the slit-like opening, the front chamber effect does not occur. Therefore, it is possible to provide audio device 7 capable of obtaining more excellent characteristics and sound quality.

Next, details of audio device 7 provided in case 62 of video display device 60 will be described.

As shown in FIG. 3, FIG. 4 and FIG. 5, in audio device 7, both of front panel 1 and back panel 2 are arranged facing diaphragms 27 of speakers 5, and are arranged on opposite sides across diaphragm 27. Side panel 3 couples front panel 1 to back panel 2. Compact speakers 5 are arranged at the center of audio device 7 formed of front panel 1, back panel 2, and side panels 3. In this exemplary embodiment, eight compact speakers 5 are linearly arranged and stored in audio device 7. Herein, each speaker 5 is provided with partition 5a that separates individual speakers 5 from each other. Accordingly, interference between sounds emitted from individual speakers 5 hardly occurs.

As a result, excellent characteristics and sound quality can be realized. In audio device 7, slit-like opening 1a as a first opening and slit-like opening 2a as a second opening are formed, and opening 1a is formed in front of diaphragm 27 orthogonal to front panel 1. Thus, in the front panel 1 side, the sound is emitted perpendicularly with respect to the amplitude direction of diaphragm 27 of each speaker 5.

On the other hand, opening 2a of audio device 7 is formed on the back surface side of diaphragm 27 and is formed substantially perpendicular to back panel 2, and emits sound in the direction opposite to the sound which is emitted toward the front panel 1. The sound emitted toward opening 1a of audio device 7 and the sound emitted toward opening 2a of audio device 7 is completely separated from each other so that these sounds do not mix in audio device 7.

In this manner, space in audio device 7 is reliably separated such that the sound emitted toward front panel 1 and the sound emitted toward back panel 2 of diaphragm 27 of each speaker 5 are not mixed. That is, as shown in FIG. 3 and FIG. 4, in audio device 7, the sound emitted toward the front surface of diaphragm 27 and the sound emitted toward the back surface of diaphragm 27 are emitted in opposite directions (directions indicated by arrows in FIG. 3, FIG. 4). Further, also in inside the audio device 7, since the sound emitted toward the front surface of diaphragm 27 and the sound emitted toward the back surface of diaphragm 27 are emitted in opposite directions, the sound emitted toward the front surface of diaphragm 27 and the sound emitted toward the back surface of diaphragm 27 can be reliably separated from each other so as not to be mixed.

Since opening 1a of audio device 7 is formed to be orthogonal to front panel 1, the sound emitted toward front panel 1 is emitted in the direction orthogonal to the amplitude direction of diaphragm 27 of each speaker 5. Therefore, slim audio device 7 having reduced dimensions and thickness can be realized.

On the other hand, since opening 2a of audio device 7 is formed to be orthogonal to back panel 2, the sound emitted toward back panel 2 is emitted in the opposite direction to the sound-emitting direction toward front panel 1. Thereby, the sound emitted toward the front surfaces of diaphragms 27 of speakers 5 and the sound emitted toward the back surfaces can be reliably separated from each other in audio device 7. Therefore, a negative effect caused by diffraction of the sound having the opposite phase component from the back surface to the front surface can be prevented, and excellent sound quality can be achieved.

The reason is as follows. That is, in the case where audio device 7 is arranged along the side of video display panel 61, the sound emitted from opening 1a of front panel 1 of audio device is emitted in the same direction as the display direction of video display panel 61. On the other hand, the sound emitted from opening 2a of audio device 7 is emitted to direction opposite to the sound emitted from opening 1a of audio device 7.

With this configuration, the sound emitted from opening 2a of audio device 7 is emitted inside video display device 60, and the sound emitted from opening 2a of audio device 7 is absorbed in video display device 60. Thereby, the sound emitted from opening 2a of audio device 7 does not mix with the sound emitted from opening 1a of audio device 7 and thus, do not exert a negative effect on the sound emitted from opening 1a of audio device 7.

Even when an internal structure of video display device 60 is not a complete sealed structure and is an air-permeable structure, a sufficient effect can be obtained. The reason is as follows. Since the sound emitted from opening 1a of audio device 7 and the sound emitted from opening 2a of audio device 7 are emitted in opposite directions, the sound having the opposite phase component from the back surface hardly reaches the front surface, and thus the negative effect can be greatly reduced. Further, each speaker 5 is provided with partition 5a that partitions adjacent speakers 5.

This can prevent sounds emitted from individual speakers 5 from interfering with each other and exerting negative effects on characteristics and sound quality. Therefore, it is possible to provide audio device 7 capable of realizing excellent characteristics and sound quality.

As described above, audio device 7 is provided with opening 1a of audio device, which can emit sound in the direction orthogonal to the amplitude direction of diaphragm 27 of each speaker 5, and is arranged along the sides of video display panel 61 to emit sound from opening 1a of audio device 7 in the same direction as the display direction of video display panel 61. This configuration can further achieve reduction in dimensions of video display device 60.

Next, audio device 7 will be described in more detail. The external dimension of audio device 7 in the longitudinal direction (vertical direction) in this exemplary embodiment is about 160 mm, when television set attachment means is included. On the other hand, the external dimension in the transverse direction (horizontal direction) as the dimension of audio device 7 in the lateral direction is about 10 mm, which is smaller than 20 mm, to achieve unprecedented reduction in dimensions. Herein, compact speakers 5 each having the overall height of about 2 mm are used in audio device 7 and therefore, the overall height of compact speakers 5 can be set to 5 mm or smaller, to achieve unprecedented reduction in thickness.

A width of a short-diameter of slit-like opening 1a and slit-like opening 2a in the thickness direction as the overall height is about 1.5 mm, which is smaller than 2 mm, whereby unprecedented reduction in thickness can be achieved. Accordingly, the overall height (that is, external dimension in the thickness direction) of audio device 7 is about 7 mm. In particular, the overall height of internal compact speaker 5 is 5 mm or smaller, and the external dimension in the transverse direction (horizontal direction) as the dimension of audio device 7 in the lateral direction or the overall height is 20 mm or smaller.

Thereby, as compared to the audio device using the conventional cone-shaped slim speaker for television of normal size, the audio device of this configuration enables reduction of dimensions of video display device 60. Further, by arranging sound emitting hole 63 of video display device 60 along the side of the video display panel, and setting the dimension of slit-like sound emitting hole 63 in the short-diameter direction to be 2 mm or smaller according to the width of about 1.5 mm of slit-like opening 1a and slit-like opening 2a in the short-diameter direction, the short-diameter of sound emitting hole 63 of video display device 60 can be equal to or smaller than 1% of the dimension of video display device 60 in the height direction. That is, in video display device 60 according to this exemplary embodiment, the short-diameter of sound emitting hole 63 can be set equal to or smaller than 1% of the height of case 62. Accordingly, the bezel of the video display device 60 can be made further slim, and reduction in dimensions can be achieved.

Since widths of sound emitting hole 63 of video display device 60 and opening 1a of audio device 7 are very small, even when a child attempts to insert his or her finger, the finger will not reach the diaphragm and the like. Accordingly, it is possible to prevent the diaphragm from being deformed by mistake. In addition, in this exemplary embodiment, since frame 26, side panel 3, and case 62 are stacked to form a three-layered structure, diaphragm 27 and speakers 5 are protected from the outer force by the three-layered structure, thereby preventing breakage and deformation due to shocks such as falling. Moreover, audio device 7 is provided with wiring means 6 that connects compact speakers 5.

Herein, in audio device 7, wiring means 6 is arranged on back panel 2, and eight compact speakers 5 are linearly arranged on wiring means 6. In this exemplary embodiment, a printed board is used as wiring means 6, and speakers 5 are electrically connected by printed wiring formed on the printed board.

Since speakers 5 are connected by the printed wiring formed on the printed board as described above, wiring can be made with an extremely small thickness. With this configuration, as compared to the conventional method of connecting the speakers by aerial wiring of speaker cords, the speaker cord can be omitted and accordingly, the thickness of at least the speaker cords can be reduced. Further, in the case of using a flexible printed board as wiring means 6, since the thickness of wiring means 6 can be further reduced, the thickness of audio device 7 can be further reduced.

Herein, a frequency band reproduced by audio device 7 is mainly middle and high frequency ranges, and when reproduction of a low frequency range is required, a separate audio device dedicated to reproduce the low frequency range may be provided in video display device 60, so that video display device 60 capable of reproducing the whole frequency band is achieved.

Since directivity of sound in the low frequency range is very wide, the audio device dedicated to reproduce sound in the low frequency range does not have to be provided on the front surface of the video display device as in the audio device dedicated to reproduce sound in the middle and high frequency ranges of narrow directivity. For example, even when the audio device is arranged in case 62 of video display device 60 and on a back surface of video display panel 61, the sound in the low frequency range can be sufficiently reproduced. Accordingly, since the audio device dedicated to reproduce sound in the low frequency range can be arranged by effectively utilizing a vacant space in video display device 60, the existence of the audio device does not disturb the reduction in dimensions of video display device 60. As a matter of course, for the low-inch video display device, it is possible to use the video display device without providing the audio device dedicated to reproduce sound in the low frequency range.

Speakers called microspeakers generally used in mobile phones or the like are used as compact speakers 5 attached to audio device 7. Compact speakers 5 called the microspeakers are mass-produced in dedicated automated mass-production facilities to be used for mobile phones. Due to the high-volume production effect, a unit price of the microspeakers is much lower than that of the conventional video speakers and therefore, even when a number of speakers are used, the price of audio device 7 can be kept low.

Compact speaker 5 using the microspeaker has a smaller maximum input than the conventional video speakers. Thus, required maximum input is achieved by using a number of compact speakers 5.

Further, voice coil 28 has the largest possible dimensions and is coupled in proximity to the outer periphery of diaphragm 27. With this configuration, heat radiating property of voice coil 28 can be improved, thereby achieving required maximum input. Furthermore, by coupling voice coil 28 in proximity to the outer periphery of diaphragm 27, the phase in amplitude of both longitudinal ends of diaphragm 27 can be made the same as the phase in voice coil 28.

With this configuration, distortion of sound from compact speakers 5 can be reduced, and stable sound pressure frequency characteristics can be achieved.

Herein, an edge for supporting diaphragm 27 to the periphery of frame 26 is made of a material that is different from a material for diaphragm 27. The edge is made of an elastic material having high flexibility, and furthermore, by inserting and molding diaphragm 27 integrally with the edge, compact speakers 5 can have a high maximum input. In this manner, it is possible to provide compact speakers 5 capable of extending the low frequency range and reproducing sound in the high frequency range. Herein, the case where eight compact speakers 5 attached linearly has been described. However, the present invention is not limited thereto, and the number may be freely set, to 2, 4, 6, 10, 12, 16, 20, and 30.

Video display device 60 in this exemplary embodiment is the plasma television or the liquid crystal television as the television receiver. Alternatively, audio device 7 in this application may be used in game equipment, smart phones, tablet portable information terminals, and information communications equipment such as mobile phone. In equipment using the relatively compact video display panel such as information communications equipment and game equipment, by using two or four speakers, dimensions and thickness can be further reduced, thereby achieving an optimum state in terms of balance among acoustic characteristics, size, and price.

In equipment using the medium-size video display panel such as the tablet portable terminal and the personal computer, by using four or six speakers, it is possible to achieve an optimum state in terms of balance among acoustic characteristics, size, and price. Furthermore, for the video display panel for the television as the television receiver and for signage used for advertisement or the like, by using eight, ten, or more speakers, it can provide an audio output to a relatively wide area, and is possible to achieve an optimum state in terms of balance among acoustic characteristics, size, and price. As described above, according to dimensions of the equipment in which audio device 7 is used, the number of speakers 5 to be coupled may be appropriately selected.

Accordingly, video display device 60 in which audio device 7 is mounted is not limited to the above-mentioned equipment, and may be applied to any device as long as it is a device that displays video. Then, by mounting audio device 7 in such video display device 60, reduction in dimensions and thickness and space savings of video display device can be achieved. The number of speakers that are linearly arranged and wired may be at least two. By aligning even numbers of speakers, serial/parallel connection of the speakers is facilitated.

With this configuration, entire audio device 7 can be easily set to a defined impedance, thereby improving productivity.

The number of compact speakers attached to audio device 7 may be set in consideration of allowable dimensions of the television in which the speakers are mounted, required maximum input of the audio device, and the sound pressure level that satisfies required sound volume.

By linearly arranging compact speakers 5 as described above, it can achieved audio device 7 with a dimension which is easily mounted on both side surfaces of video display panel 61 such as the television.

In this exemplary embodiment, the external shape of compact speakers 5 is rectangle, but other shapes may be adopted. For example, rectangular, track-like, or elliptical compact speakers 5 may be used.

With reduction in dimensions of the information communications equipment such as the mobile phone in recent years, the slim shape including rectangle (track and ellipse) is becoming mainstream, and thus, the compact speakers having a various shapes exist, and user can be freely select among them even when using the conventional compact speakers. Accordingly, even when the compact speakers having the track-like or elliptical external shape are used, similar effects can be obtained, and the shape of the speakers can be freely selected according to design of the video display device in which the speakers are mounted, and design, characteristics, and sound quality of the audio device.

With this configuration, due to the manufacturing volume efficiency, slim compact speakers 5 are available at low costs, and low price of video display device 60 can be achieved by using these slim microspeakers.

In the above-description, the case where the electrodynamic type compact micro-speakers are used as compact speakers 5 used in audio device 7 is described.

However, compact speakers 5 used in audio device 7 of this application are not limited thereto, and may be any type of speakers such as piezoelectric speakers and electrostatic speakers as long as they are compact and thin. In these cases, the effects as those in electrodynamic microspeakers can be obtained as well. Next, a method of separating sound emitted toward the front surface of diaphragm 27 of each speaker 5 from sound emitted toward the back surface of the diaphragm 27 will be described.

By using speakers 5 having rectangular external shape, speakers 5 of the rectangular external shape are linearly coupled to each other, and by connecting side panel 3 to the outer periphery of the coupled speakers 5, the sound emitted toward the front surface is separated from the sound emitted toward the back surface. At this time, by using also an adhesive or a sealing agent to prevent air leakage, air leakage can be further eliminated, and excellent sound quality can be achieved.

In the case where the external shape of speakers 5 is track or ellipse, air leakage can be easily eliminated by further providing a baffle plate for attaching the speakers, thereby achieving excellent sound quality. That is, by attaching the track-like or elliptical speakers to the baffle plate and coupling the baffle plate to side panel 3, the sound emitted toward the front surface can be reliably separated from the sound emitted toward the back surface. In this case as well, by also using an adhesive or a sealing agent to prevent air leakage, air leakage can be further eliminated, and excellent sound quality can be achieved.

Furthermore, since partitions 5a that partition individual speakers 5 are provided, excellent sound quality and characteristics can be realized without occurring an interference between the speakers to exert negative effects on sound quality and characteristics. Partitions 5a are provided on both sides of opening 1a of front panel 1 and opening 2a of back panel 2, thereby speakers 5 are completely partitioned.

In the case where back panel 2 is formed of the printed board, partitions 5a may be formed only in front panel 1. Then, by contacting frames 26 of speakers 5 with partitions 5a provided in front panel 1, individual speakers 5 can be completely partitioned. However, in this case, the partitions 5a is not provided in the back panel direction. Thus, by substituting the partitions with frames 26 and by providing sound emitting holes in side surfaces of frames 26 to emit sound in the opposite direction to sound emitted toward the front surfaces, the similar effect can be obtained.

Alternatively, a partition having a larger height than the overall height of speaker 5 in one of the front panel 1 or back panel 2 may be provided, and speaker 5 may be inserted into this partition. In view of preventing interference between the speakers, it is desired to provide partition 5a for each of all speakers 5 as in the above-mentioned configuration. However, the present invention is not limited thereto, and cost performance can be improved by, for example, providing the partition by unit of a pair of speakers 5, reducing the partition on the side of back panel 2, or omitting a part or all of the partitions according to desired characteristics and sound quality.

Furthermore, in FIG. 3, a gap is generated between yoke 23 and back panel 2 of speakers 5. However, yoke 23 and back panel 2 may be coupled contacted, and a sound emitting hole may be provided in the side surface of frame 26 to emit sound toward the back surface. With this configuration, the gap between yoke 23 and back panel 2 of speakers 5 and the partition on the side of back panel 2 can be omitted, thereby further reducing thickness and costs.

Front panel 1 may be extended to the side surface to constitute side panel 3, front panel 1 and side panel 3 may be integrated using the same material, and side panel 3 may be used as a guide for speakers 5 to improve production efficiency.

Next, outer shape and dimensions of speakers 5 and audio device 7 will be described in detail. Assuming that audio device 7 is arranged on both side surfaces or upper and lower surfaces of the video display panel of the plasma television or the liquid crystal television as video equipment, external shape of audio device 7 is desirably an oblong rectangle.

As for compact microspeakers widely used in mobile phones having a rectangle external shape, generally, the horizontal dimension is about 9 mm, the vertical dimension is about 16 mm, and the thickness (i.e. the overall height) is about 3 mm. The speakers having such external dimensions are advantageous for linearly arranging a number of speakers to constitute an oblong rectangular audio device 7. When such general-purpose microspeakers are used to constitute audio device 7, and when eight speakers are linearly arranged in the longitudinal direction, the external dimension in the horizontal direction, i.e., the transverse direction can be made about 10 mm, thereby achieving reduction in dimensions. When including the set attachment means, the external dimension in the vertical direction, i.e., the longitudinal direction is about 160 mm, thereby achieving reduction in thickness.

Herein, a hole or a notch is provided at each longitudinal end of audio device 7 for attaching the speaker to the television set. Among external dimensions of audio device 7 in the thickness direction, (i.e., the overall height) can be made about 7 mm, thereby achieving reduction in thickness.

With the above-mentioned configuration, an aspect ratio of the external dimension in the vertical direction, (i.e., the long side direction) to the horizontal direction, (i.e., the short side direction) can be set to 10 or larger, thereby realizing audio device 7 capable of reducing thickness with the unprecedented high aspect ratio. By linearly arranging eight compact microspeakers in the longitudinal direction, by forming opening 1a toward the front panel 1 so that the sound can be emitted toward the direction orthogonal to the amplitude direction of diaphragm 27 of each speaker 5, and by arranging opening 1a so as to face the front side as described above, a slim shape, and reduction in dimensions and thickness can be achieved.

In the back panel direction, opening 2a is formed so as to emit sound toward the direction opposite to the direction of the sound emitting toward the front panel, thus the sound emitted toward the front surfaces of diaphragms 27 of speakers 5 can be reliably separated from the sound emitted toward the back surface, and thereby preventing the sound having the opposite phase component from the back surface from diffracting to the front surface side and exerting negative effects. This can prevent lowering of the sound pressure level and achieve low distortion and excellent sound quality. Furthermore, by covering opening 1a and opening 2a with a dustproof net, it can prevent minute dust from entering into opening 1a and opening 2a, and operational failure such as abnormal sound can be prevented, and thus the quality and reliability is improved.

Since air permeability can be adjusted by selecting the aperture ratio of the dustproof net, sound pressure frequency characteristics of audio device 7 can be freely adjusted by adjusting an acoustic load applied to speakers 5, sound quality. Especially, by applying the acoustic load to the sound emitted toward the back surfaces of diaphragms 27 of speakers 5 to adjust sound quality and sound pressure frequency characteristics of audio device 7, sound quality can be adjusted with high accuracy. Thereby, the sound having the opposite phase component from the back surface can be prevented from diffracting to the front surface side and exertion of negative effects can be further prevented, and great effects such as prevention of lowering of the sound pressure level and lower distortion can be obtained.

Details of speakers 5 of audio device 7 have been described. Next, a method of fixing audio device 7 to the inside of case 62 of video display device 60 will be described.

Figure 6A:
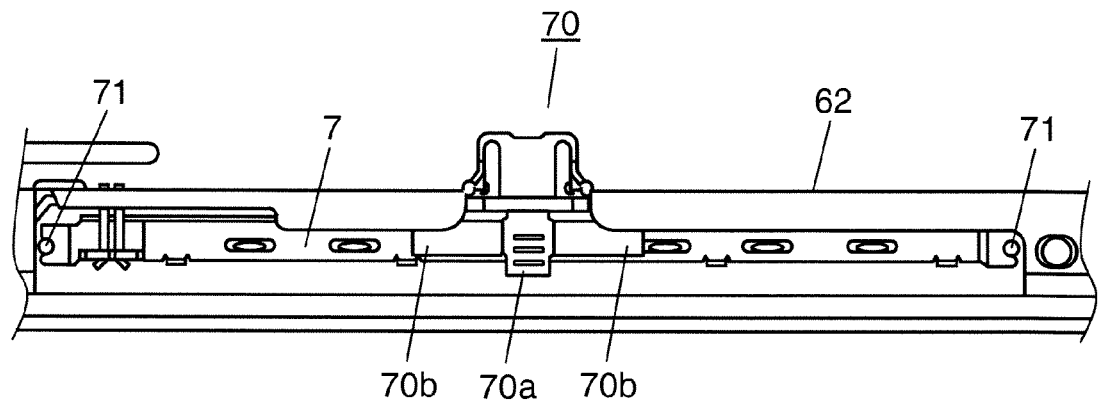
FIG. 6A is a front view showing a state where the audio device is fixed to the video display device according to the first exemplary embodiment of the present invention.
Figure 6B:
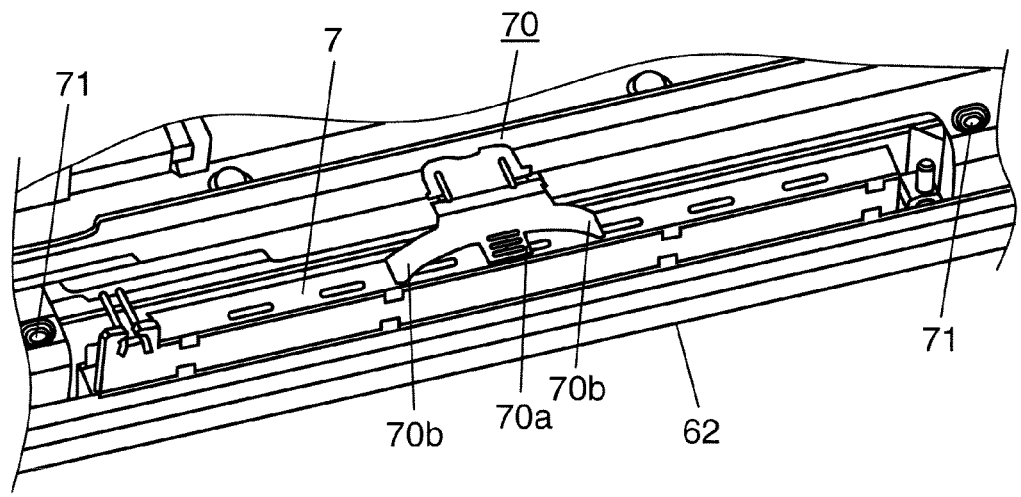
FIG. 6B is a perspective view showing the state where the audio device is fixed to the video display device according to the first exemplary embodiment of the present invention.

FIG. 6A is a view showing a state where audio device 7 is fixed to video display device 60 according to the first exemplary embodiment of the present invention. FIG. 6A shows the state audio device 7 is fixed when viewed from the inside of video display device 60 toward the front surface of video display device 60. FIG. 6B is a perspective view showing the state where audio device 7 is fixed to video display device 60 according to the first exemplary embodiment of the present invention.

As shown in FIGS. 6A and 6B, in this exemplary embodiment, audio device 7 is fixed to case 62 of video display device 60 by being pressurized by clamper 70 as an elastic body from the inner side of the case. Clamper 70 is provided with pressing portion 70a and end portion 70b which is pressed by audio device 7. When pressing portion 70a is pressed, the pressed state of audio device 7 by clamper 70 is released.

Positioning pin 71 for positioning audio device 7 at a fixed position is provided in case 62 of video display device 60. First, positioning pin 71 is engaged to the hole or the notch, which is a mean for attaching the audio device 7 to the television set, for positioning audio device 7. Second, the audio device 7 is pressured by damper 70 from the back side for fixing. Thereby, audio device 7 can be fixed in case 62 with high accuracy without generating any positional shift. As a matter of course, audio device 7 may be fastened by tightening a screw into the hole or the notch as the set attachment means of audio device 7. However, in order to reduce the number of attachment screws and manufacturing steps of screwing, audio device 7 is pressurized by clamper 70 as the elastic body and fixed. Accordingly, the hole or the notch as the mean for attaching audio device 7 to the television set is used to insert positioning pin 71 thereinto. As a result, audio device 7 can be fixed in case 62 with high accuracy and high manufacturing efficiency without causing any positional shift.

Herein, polyoxymethylene or polyacetal (POM) is used as the material for the clamper as the elastic body. By using such a material, dimensional stability of clamper 70 as the elastic body, heat resistance, and mechanical strength can be improved. Thus, the accuracy of pressurized fixation of audio device 7 utilizing clamper 70 to the inside of case 62 can be increased, and stability, quality, and reliability are improved. Upon pressurization, audio device 7 is pressurized with a load of about 400 g and fixed to the inside of case 62 of video display device 60. In this manner, audio device 7 is fixed so as to be sandwiched by clamper 70 as the elastic body with the load of about 400 g from the inner side of case 62. Accordingly, the pressurized state can be maintained at all times, whereby audio device 7 is firmly fixed to case 62.

Further, since oscillation caused when audio device 7 produces sound can be also reduced or absorbed, occurrence of abnormal sound such as buzz and distortion can be prevented. Herein, it is desired that the load imposed by damper 70 as the elastic body fall within the range between 300 g and 500 g. By setting the load imposed by damper 70 to the range between 300 g and 500 g, audio device 7 can be pressed onto case 62 in an optimum state. Thus, the optimum pressurized state can be maintained at all times without imposing such a large load to deform audio device 7. At the same time, since oscillation caused when audio device 7 produces sound can be sufficiently reduced or absorbed, audio device 7 can be firmly fixed to case 62 while preventing occurrence of abnormal sound such as buzz and distortion.

In the case where the load imposed on damper 70 is smaller than 300 g, audio device 7 cannot be firmly attached to case 62, leading to an unstable state, and oscillation caused when audio device 7 produces sound cannot be sufficiently reduced or absorbed. Further, in the case where the load imposed on clamper 70 is larger than 500 g, the large load causes deformation of audio device 7 and the deformation easily forms a gap between audio device 7 and case 62. Sound leakage from this gap becomes a cause of degradation of sound quality and occurrence of distortion.

By using polyoxymethylene or polyacetal (POM), which has a high heat resistance and a high mechanical strength, as the material for damper 70, deterioration due to heat shock and aged degradation hardly occurs and therefore, stable pressurized fixation can be achieved for a long time, and quality and reliability can be improved for a long time.

With this configuration, some fastening screws can be omitted, thereby reducing the production steps of screwing and in turn, achieve low price of video display device 60.

Figure 7:
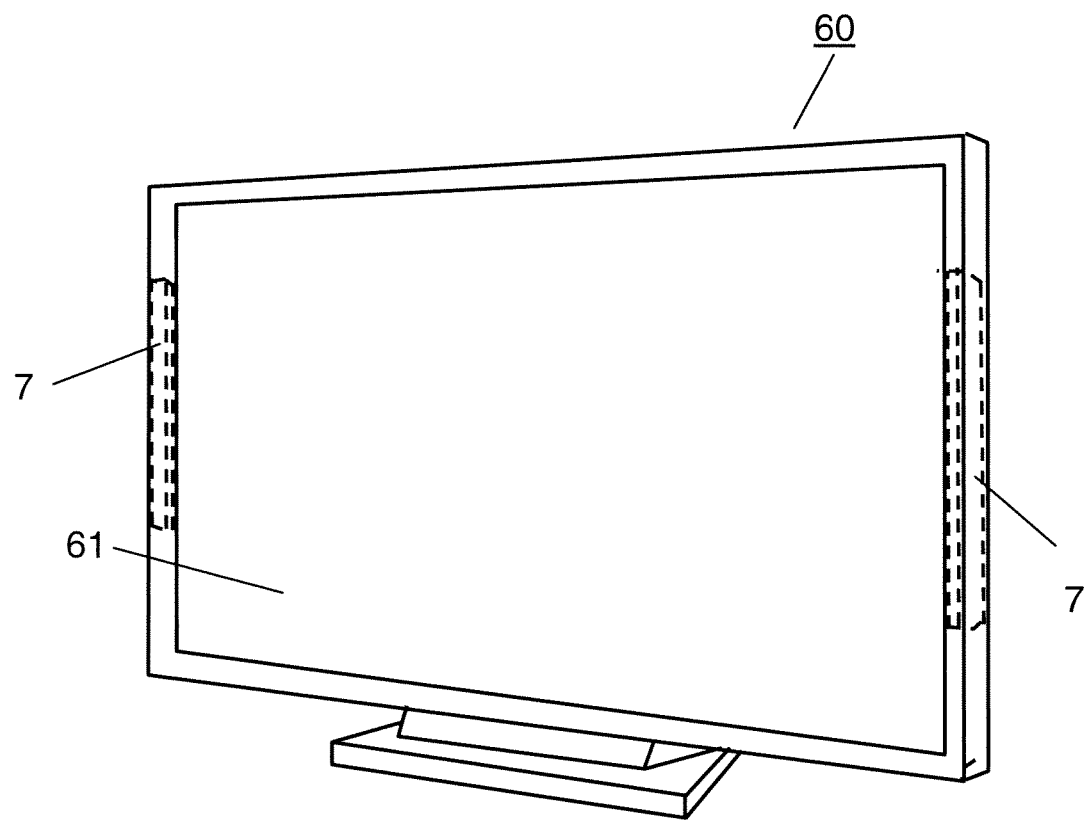
FIG. 7 is a front view showing another arrangement example of the audio device according to the first exemplary embodiment of the present invention.

The case where audio device 7 is arranged along the lower side of video display panel 61 of video display device 60 in the longitudinal direction has been described. However, the configuration of this application is not limited thereto and, as shown in FIGS. 7A and 7B, a pair of audio devices 7 may be provided on each of right and left sides of video display panel 61. In this case, the sound emitting holes are provided on the right and left sides of video display panel 61. By arranging audio devices 7 on the right and left sides of video display device 60, as in the case where audio device 7 is arranged below video display panel 61, the bezel narrowing of video display device 60 can be achieved. Moreover, in this case, since dimensions of video display device 60 in the vertical direction can be reduced. Furthermore, a large distance between the pair of audio devices 7 provided on the right and left sides can be ensured, and thus channel separation at the time of stereo reproduction can be improved.

Second Exemplary Embodiment

Figure 8:
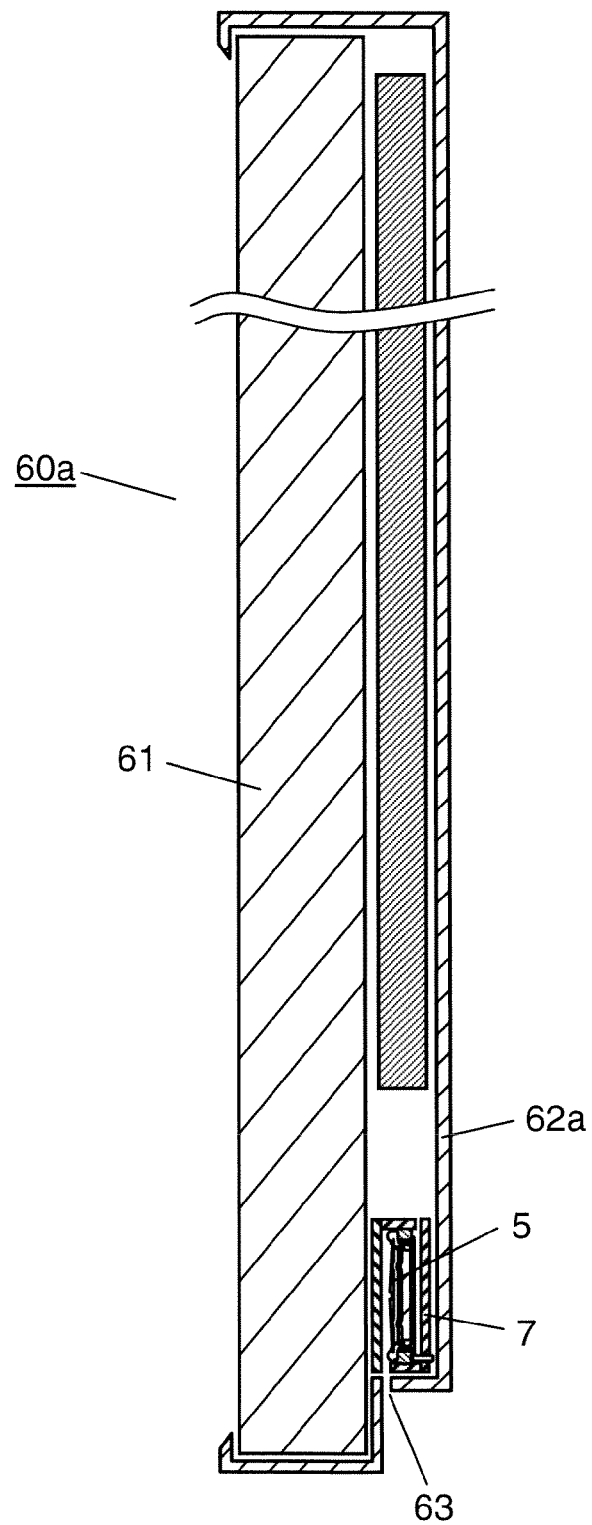
FIG. 8 is a sectional view of a video display device according to a second exemplary embodiment of the present invention.
Figure 9:
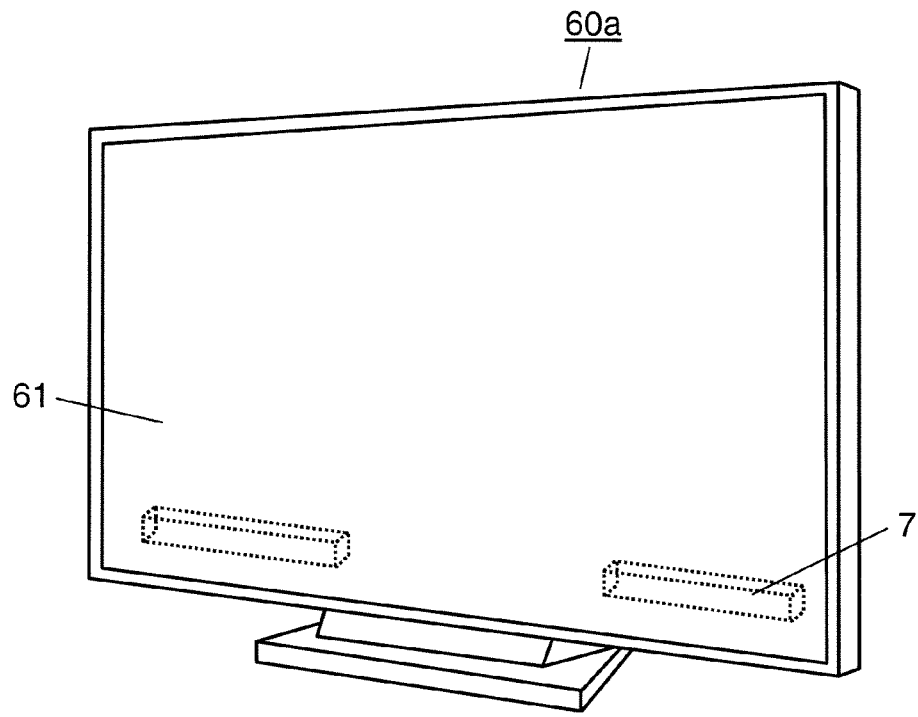
FIG. 9 is a perspective view of the video display device according to the second exemplary embodiment of the present invention.
Figure 10:
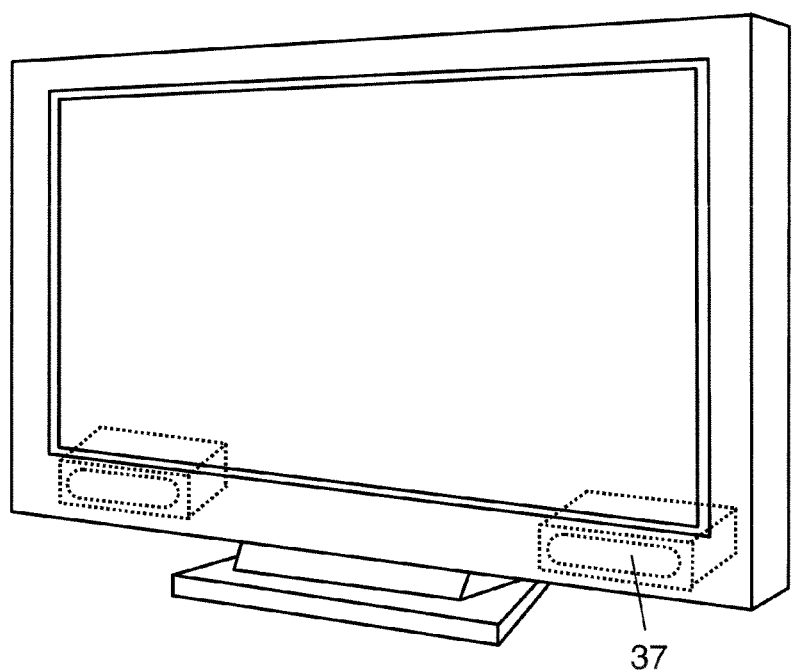
FIG. 10 is a perspective view of a conventional video display device.
Figure 11:
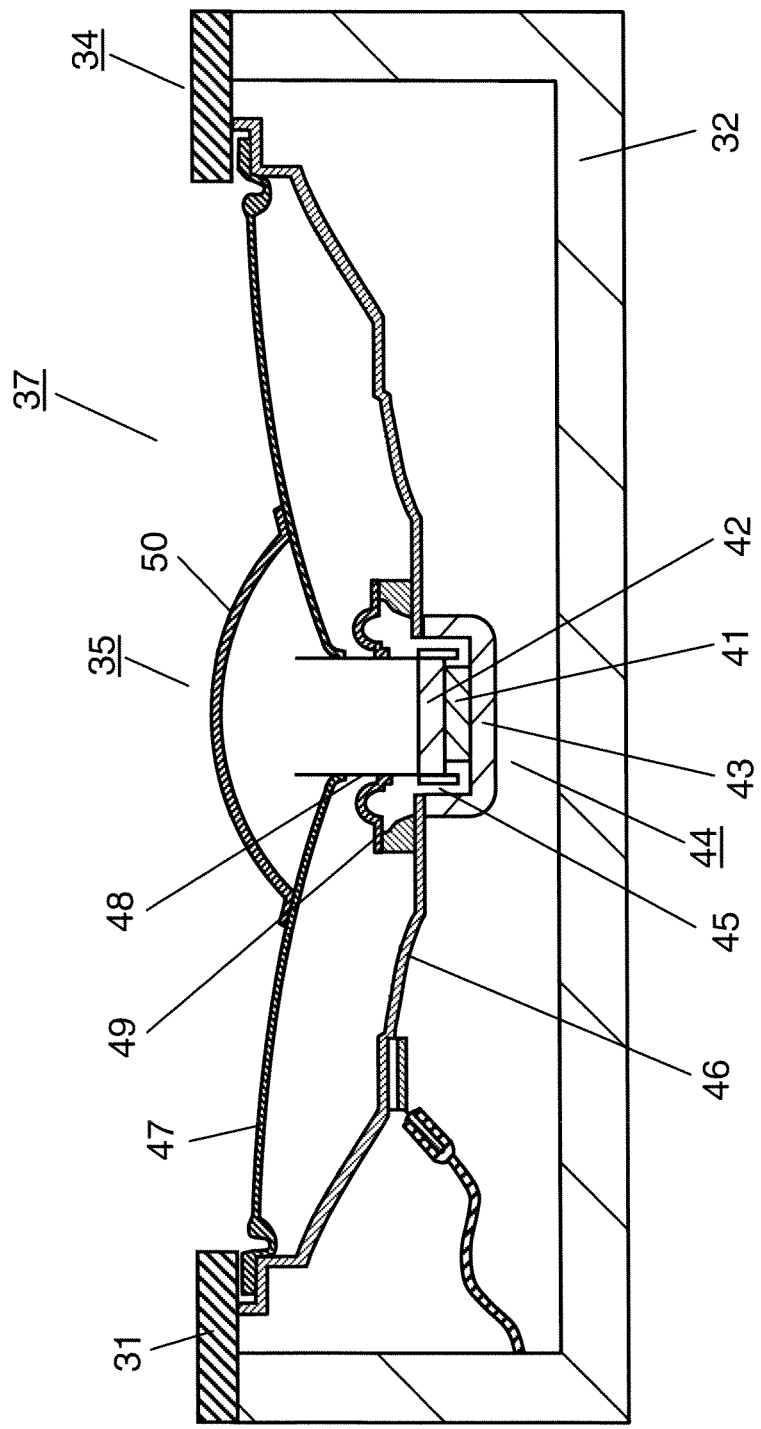
FIG. 11 is a longitudinal sectional view of an audio device used in the conventional video display device.

In the first exemplary embodiment, in video display device 60, audio device 7 is provided at the lower side of video display panel 61. On the contrary, in this exemplary embodiment, as shown in FIG. 8 and FIG. 9, in video display device 60a, audio device 7 is arranged on the back surface of video display panel 61, and on the inner side of the outer periphery of video display panel 61. That is, audio device 7 is arranged on the back surface of video display panel 61, and in proximity to the lower side of video display panel 61, such that its longitudinal direction conforms to the lower side of video display panel 61. That is, a plurality of compact speakers 5 is arranged along the lower side of video display panel 61. In this exemplary embodiment, equivalent parts to those in the first exemplary embodiment are given the same reference numerals, and description thereof may be omitted. Audio device 7 is fixed to case 62 by screwing positioning pin 71 shown in FIG. 6A into a threaded hole provided in a fixed position of case 62.

The amplitude direction of diaphragm 27 of each compact speaker 5 can be set substantially parallel to or orthogonal to the video display surface of video display panel 61. In FIG. 8, the amplitude direction of diaphragm 27 is substantially orthogonal to the video display surface of video display panel 61, and the opening of audio device 7 is formed in a surface substantially orthogonal to the video display surface of video display panel 61, that is, formed downward.

Sound emitting hole 63 is provided in a back surface of case 62a at a position corresponding to slit-like opening 1a of audio device 7. By providing sound emitting hole 63 at the lower side of the back surface of video display panel 61, a position close to the viewer's ears can be ensured. Then, by emitting sound downward from sound emitting hole 63, a part of the emitted sound is reflected on a floor surface and reaches the viewer's ears. Thus, the sound can be efficiently transmitted to the viewer's ears.

As described above, the amplitude direction of diaphragm 27 of each compact speaker 5 is substantially orthogonal to the video display surface of video display panel 61. Thus, each compact speaker 5 is arranged such that the front surface of diaphragm 27 (front side of the diaphragm in FIG. 8) is oriented to video display panel 61, and emits the sound emitted mainly toward the front surface of diaphragm 27 from sound emitting hole 63 to the outside of video display device 60a.

Even with this configuration, the sound having the opposite phase component, which occurs on the side of the back surface of diaphragm 27, can be prevented from diffracting to the front surface side, and mixture of the sound emitted toward the front surface of diaphragm 27 and the sound having the opposite phase component, which is emitted toward the back surface of diaphragm 27, can be suppressed. Therefore, negative effects such as decrease in the sound pressure level can be prevented, and sound having excellent characteristics and quality can be reproduced. Further, with the configuration of this exemplary embodiment, since sound can be emitted from sound emitting hole 63 of video display device 60a, a narrow bezel of video display device 60a is realized. Especially, since audio device 7 is arranged on the back surface of video display panel 61 and on the inner side of the outer periphery of video display panel 61, only minimum required case 62a exists on the outer periphery of video display panel 61, and thus a narrow bezel can be achieved to the utmost limit.

In FIG. 8 and FIG. 9, audio device 7 is arranged on the back surface of video display panel 61 of video display device 60a and in proximity to a lower side of video display panel 61. However, a pair of audio devices 7 may be provided on the back surface of video display panel 61 and in proximity to each of right and left sides of video display panel 61. Even when audio devices 7 are arranged in proximity to each of right and left sides of video display panel 61, as in the case where audio devices 7 are arranged in proximity to the lower side of video display panel 61, thickness of video display device 60a can be reduced. Further, since a large distance between the pair of right and left audio devices 7 can be ensured and further, sound can be emitted to the right and left in opposite directions, channel separation at stereo reproduction can be improved.

Since directivity of sound in the low frequency range is very wide, audio device 7 dedicated to reproduce sound in the low frequency range can be located any position, as long as it is located on the back surface of video display panel 61 in case 62a of video display device 60a, the sound in the low frequency range can be sufficiently reproduced.

As described above, audio device 7 of the present invention can be mounted in low-inch to high inch video display devices 60, 60a. Accordingly, in video display devices 60, 60a each mounted with audio device 7 therein, unprecedented reduction in thickness and dimensions and space savings can be realized in video display devices 60, 60a due to the above-mentioned features of audio device 7. Further, since audio device 7 is configured by linearly arranging a number of compact speakers 5, in terms of sound quality, clarity of the sound in the middle and high frequency ranges is high, and excellent sound quality having less distortion can be achieved. Due to the high-volume production effect, a number of inexpensive microspeakers can be utilized, and thus satisfactory video display devices 60, 60a can be provided in terms of costs.

In high-inch video display devices 60, 60a, a pair of audio devices 7 may be arranged on right and left sides as a smallest unit and furthermore, more audio devices 7 may be arranged in the vertical and horizontal directions. By mounting the audio devices 7 in this manner, required maximum input and sound pressure level can be adjusted. Furthermore, as needed, audio devices 7 may be formed like a frame arranged along the entire outer circumferences of cases 62, 62a that enclose the outer peripheries of video display panels 61 of video display devices 60, 60a. By mounting audio devices 7 in this manner, required maximum input and sound pressure level can be further satisfied.

As described above, audio device 7 used in video display devices 60, 60a of the present invention is arranged in the vertical or horizontal direction of the outer periphery of video display panel 61, or on the back surface of video display panel 61, and is configured by linearly arranging two or more compact speakers. Then, sound emitting holes 63 of video display devices 60, 60a are provided in the outer peripheries of video display panels 61 in cases 62, 62 of video display devices 60, 60a, respectively, at positions corresponding to slit-like opening 1a of audio device 7, such that sound of audio device 7 is emitted from sound emitting holes 63 of video display devices 60, 60a. Further, the dimension of audio device 7 in the lateral direction is the same as or smaller than that of video display panel 61.

The above-configuration enables the narrow bezel of video display devices 60, 60a. Therefore, reduction in dimensions and thickness and space savings of video display devices 60, 60a can be realized, thereby realizing compact video display devices 60, 60a demanded in the market.

INDUSTRIAL APPLICABILITY

A video display device according to the present invention can be applied to a video display device to be reduced in dimensions and thickness.

REFERENCE MARKS IN THE DRAWINGS 1a, 2a opening
5 speaker (compact speaker)
7 audio device
27 diaphragm
60, 60a video display device
61 video display panel
62,62a case
63 sound emitting hole

The invention claimed is:
1. A video display device comprising:
a video display panel that displays video;
a case that encloses an outer periphery of the video display panel;
audio devices that are arranged in proximity to the outer periphery of the video display panel, each of the audio devices including a casing having a front panel, a rear panel and side panels, and a plurality of speakers linearly arranged inside the casing of the audio device; and
sound emitting holes that correspond to openings of the audio devices, respectively, the sound emitting holes being provided to the case and emitting sound generated by the audio devices to the outside of the case, wherein:
the casing of the audio device is disposed inside the case,
diaphragms of the plurality of speakers face the front panel of the casing of the audio device, along a vibration direction of the diaphragm,
the openings of the audio devices are disposed in the side panels of the casing of the audio device,
the audio devices are provided on an outer side of the outer periphery of the video display panel,
an amplitude direction of a diaphragm of each of the speakers is perpendicular to a video display surface of the video display panel,
the openings of the audio devices are provided in a surface parallel to the video display surface of the video display panel,
the openings include a first opening that emits sound emitted from a front surface of the diaphragm and a second opening that emits sound emitted from a back surface of the diaphragm,
the first opening is arranged so as to be opposed to corresponding one of the sound emitting holes,
the second opening is arranged opposite to the first opening across a given audio device, and
the audio device is configured such that sound having an opposite phase component occurred on a back surface side of the diaphragm is suppressed from diffracting to a front surface side, and mixture of the sound emitted toward a front surface of the diaphragm and the sound having the opposite phase component emitted toward the back surface of the diaphragm is suppressed.

2. The video display device according to claim 1, wherein a dimension of each of the audio devices in a lateral direction is equal to or smaller than a dimension of the video display panel in the lateral direction.

3. The video display device according to claim 1, wherein an amplitude direction of a diaphragm of each of the speakers is orthogonal to the video display surface of the video display panel.

4. The video display device according to claim 1, wherein a direction in which the speakers are linearly arranged is a longitudinal direction of the speakers.

5. The video display device according to claim 1, wherein:
each of the sound emitting holes has a rectangular shape, and
a short-diameter of the rectangular shape is set to 2 mm or smaller.

6. The video display device according to claim 1, wherein:
each of the sound emitting holes has a rectangular shape, and
a short-diameter of the rectangular shape is set to 1% of a height of the case or smaller.

7. The video display device according to claim 1, wherein a dimension of each of the audio devices in a transverse direction is 20 mm or smaller.

8. The video display device according to claim 1, wherein an overall height of the speakers is 5 mm or smaller.

9. The video display device according to claim 1, wherein the audio devices are fixed by being pressurized from an inner side of the case.

10. The video display device according to claim 1, wherein the audio devices are fixed by being sandwiched by an elastic body from an inner side of the case.

11. A video display device comprising:
a video display panel that displays video;
a case that encloses an outer periphery of the video display panel;
audio devices that are arranged in proximity to the outer periphery of the video display panel, each of the audio devices including a casing having a front panel, a rear panel and side panels, and a plurality of speakers linearly arranged inside the casing of the audio device; and
sound emitting holes that correspond to openings of the audio devices, respectively, the sound emitting holes being provided to the case and emitting sound generated by the audio devices to the outside of the case, wherein:
the casing of the audio device is disposed inside the case,
diaphragms of the plurality of speakers face the front panels of the casing of the audio device, along a vibration direction of the diaphragm, and the openings of the audio devices are disposed in the side panels of the casing of the audio device, the audio devices are provided on a back surface side of the video display, an amplitude direction of a diaphragm of each of the speakers is perpendicular to a video display surface of the video display panel, the openings of the audio devices are provided in a surface perpendicular to the video display surface of the video display panel, the openings include a first opening that emits sound emitted from a front surface of the diaphragm and a second opening that emits sound emitted from a back surface of the diaphragm, the first opening is arranged so as to be opposed to corresponding one of the sound emitting holes, the second opening is arranged opposite to the first opening across a given audio device, and the audio device is configured such that sound having an opposite phase component occurred on a back surface side of the diaphragm is suppressed from diffracting to a front surface side, and mixture of the sound emitted toward a front surface of the diaphragm and the sound having the opposite phase component emitted toward the back surface of the diaphragm is suppressed.

* * * * *